United States Patent
de Vangel et al.

(10) Patent No.: US 11,068,784 B2
(45) Date of Patent: Jul. 20, 2021

(54) GENERIC QUANTIZATION OF ARTIFICIAL NEURAL NETWORKS

(71) Applicant: Mipsology SAS, Palaiseau (FR)

(72) Inventors: Benoit Chappet de Vangel, Paris (FR); Vincent Moutoussamy, Montrouge (FR); Ludovic Larzul, El Dorado Hills, CA (US)

(73) Assignee: MIPSOLOGY SAS, Palaiseau (FR)

( * ) Notice: Subject to any disclaimer, the term of this patent is extended or adjusted under 35 U.S.C. 154(b) by 0 days.

(21) Appl. No.: 16/258,552

(22) Filed: Jan. 26, 2019

(65) Prior Publication Data
US 2020/0242473 A1   Jul. 30, 2020

(51) Int. Cl.
G06F 15/18 (2006.01)
G06N 3/08 (2006.01)
G06N 3/04 (2006.01)

(52) U.S. Cl.
CPC ............ G06N 3/082 (2013.01); G06N 3/04 (2013.01)

(58) Field of Classification Search
CPC .................................. G06N 3/082; G06N 3/04
See application file for complete search history.

(56) References Cited

U.S. PATENT DOCUMENTS

| | | | | | |
|---|---|---|---|---|---|
| 5,561,615 A | * | 10/1996 | Kuo | ......................... | H03M 7/24 708/204 |
| 2015/0244918 A1 | * | 8/2015 | Svensson | ............. | H04N 5/2353 348/229.1 |
| 2015/0269479 A1 | * | 9/2015 | Julian | ................... | G06N 3/0481 706/25 |
| 2016/0328646 A1 | | 11/2016 | Lin et al. | | |
| 2019/0095777 A1 | * | 3/2019 | Kim | ........................ | G06N 3/063 |
| 2019/0122100 A1 | * | 4/2019 | Kang | ......................... | G06F 7/57 |

OTHER PUBLICATIONS

Siri, B., Berry, H., Cessac, B., Delord, B., & Quoy, M.. A mathematical analysis of the effects of Hebbian learning rules on the dynamics and structure of discrete-time random recurrent neural networks.(2008)Neural Computation,20(12), 2937-2966. (Year: 2008).*
"Measuring Saturation in Neural Networks" 2015 IEEE Symposium Series on Computational Intelligence Anna Rakitianskaia Andries Engelbrecht (Year: 2015).*

(Continued)

Primary Examiner — Luis A Sitiriche
(74) Attorney, Agent, or Firm — Georgiy L. Khayet (57) ABSTRACT

Systems and methods for performing a quantization of artificial neural networks (ANNs) are provided. An example method may include receiving a description of an ANN and input data associated with the ANN, wherein the input data are represented according to a first data type; selecting a first value interval of the first data type to be mapped to a second value interval of a second data type; performing, based on the input data and the description of the ANN, the computations of one or more neurons of the ANN, wherein the computations are performed for at least one value within the second value interval, the value being a result of mapping a value of the first value interval to a value of the second value interval; determining, a measure of saturations in neurons of the ANN, and adjusting, based on the measure of saturations, the value intervals.

20 Claims, 10 Drawing Sheets

(56) References Cited

OTHER PUBLICATIONS

Ahmad Shawahna et al: "FPGA-based Accelerators of Deep Learning Networks for Learning and Classification: A Review", arxiv.org, Cornell University Library, 201 Olin Library Cornell University Ithaca, NY 14853, Jan. 1, 2019 (Jan. 1, 2019), XP081010484, DOI: 10.1109/Access.2018.2890150, the whole document.
Darryl D Lin et al: "Fixed Point Quantization of Deep Convolutional Networks", Nov. 19, 2015 (Nov. 19, 2015), pp. 1-10, XP055284812, Retrieved from the Internet: URL: https:jjarxiv.orgfpdf/1511.06393v3.pdf [retrieved on Jun. 30, 2016], p. 1-8.
Djalaei Babak et al: "Optimizing embedded neural networks based on saturated states", 2018 Real-Time and Embedded Systems and Technologies (RTEST), IEEE, May 9, 2018 (May 9, 2018), pp. 24-30, XP033366968, DOI: 10.1109/RTEST.2018.8397075 [retrieved on Jun. 26, 2018], p. 24-29, right-hand column, last paragraph.
Ian Taras et al: "Quantization Error as a Metric for Dynamic Precision Scaling in Neural Net Training", arxiv.org, Cornell University Library, 201, Olin Library Cornell University Ithaca, NU 14853, Jan. 25, 2018 (Jan. 25, 2018), XP081014281, p. 1-3.
Jungwook Choi et al: "PACT: Parameterized Clipping Activation for Quantized Neural Networks", arxiv.org, Cornell University Library, 201, Olin Library Cornell University Ithaca, NY 14853, May 16, 2018 (May 16, 2018), XP081246007, p. 1-9, paragraph 1, Appendices A and B.

\* cited by examiner

GENERIC QUANTIZATION OF ARTIFICIAL NEURAL NETWORKS

TECHNICAL FIELD

The present disclosure relates generally to data processing and, more particularly, to system and method for generic quantization of artificial neural networks.

BACKGROUND

Artificial Neural Networks (ANNs) are simplified and reduced models reproducing behavior of human brain. The human brain contains 10-20 billion neurons connected through synapses. Electrical and chemical messages are passed from neurons to neurons based on input information and their resistance to passing information. In the ANNs, a neuron can be represented by a node performing a simple operation of addition coupled with a saturation function. A synapse can be represented by a connection between two nodes. Each of the connections can be associated with an operation of a multiplication by a constant. The ANNs are particularly useful for solving problems that cannot be easily solved by classical computer programs.

While forms of the ANNs may vary, they all have the same basic elements similar to the human brain. A typical ANN can be organized into layers, each of the layers may include many neurons sharing similar functionality. The inputs of a layer may come from a previous layer, multiple previous layers, any other layers or even the layer itself. Major architectures of ANNs include Convolutional Neural Network (CNN), Recurrent Neural Network (RNN), and Long Term Short Memory (LTSM) network, but other architectures of ANN can be developed for specific applications. While some operations have a natural sequence, for example a layer depending on previous layers, most of the operations can be carried out in parallel within the same layer. The ANNs can then be computed in parallel on many different computing elements similar to neurons of the brain. A single ANN may include hundreds of layers. Each layer may involve millions of connections. Thus, a single ANN may potentially require billions of simple operations like multiplications and additions.

Because of the larger number of operations and their parallel nature, ANNs can result in a very heavy load for processing units (e.g., CPU), even ones running at high rates. Sometimes, to overcome limitations of CPUs, graphics processing units (GPUs) can be used to process large ANNs because GPUs have a much higher throughput capacity of operations in comparison to CPUs. Because this approach solves, at least partially, the throughput limitation problem, GPUs appear to be more efficient in the computations of ANNs than the CPUs. However, GPUs are not well suited to the computations of ANNs because the GPUs have been specifically designed to compute graphical images.

The GPUs may provide a certain level of parallelism in computations. However, the GPUs are constraining the computations in long pipes, which results in latency and lack of reactivity. To deliver the maximum throughput, very large GPUs can be used which may involve excessive power consumption, a typical issue of GPUs. Since the GPUs may require more power consumption for the computations of ANNs, the deployment of GPUs can be difficult.

To summarize, CPUs provide a very generic engine that can execute very few sequences of instructions with a minimum effort in terms of programming, but lack the power of computing required for ANNs. GPUs are slightly more parallel and require a larger effort of programming than CPUs, which can be hidden behind libraries with some performance costs, but are not very well suitable for ANNs.

Field Programmable Gate Arrays (FPGAs) are professional components that can be programmed at the hardware level after they are manufactured. The FPGAs can be configured to perform computations in parallel. Therefore, FPGAs can be well suited to compute ANNs. Programming of FPGAs, however, is challenging, requiring a much larger effort than programming CPUs and GPUs. Thus, adaption of FPGAs to perform ANN computations can be more challenging than for CPUs and GPUs.

Most attempts in programming FPGAs to compute ANNs have been focusing on a specific ANN or a subset of ANNs, or required to modify the ANN structure to fit into a specific limited accelerator, or provided a basic functionality without solving the problem of computing ANN on FPGAs globally. The computation scale is typically not taken into account by existing FPGA solutions, many of the research being limited to a single or few computation engines, which could be replicated. Furthermore, the existing FPGA solutions do not solve the problem of massive data movement required at a large scale for the actual ANN involved in real industrial applications.

The inputs computed with an ANN are typically provided by an artificial intelligence (AI) framework. Those programs are used by the AI community to develop new ANN or global solutions based on ANN. However, FPGAs typically lack integration with AI frameworks.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer-implemented systems and methods for quantization of ANNs without involving computations on values represented by floating point types. Embodiments of the present disclosure may facilitate determination of quantization intervals for ANN data involving computations performed on values of types excluding floating point types.

According to one example embodiment, a system for performing a quantization of ANN is provided. The system may include one or more processors configured to receive a description of the ANN and input data associated with the ANN. The description of the ANN can be represented according to a first data type. The one or more processors may determine a first value interval of the first data type to be mapped to a second value interval of a second data type. The processors may further perform, based on the input data and the description of the ANN, computations of one or more neurons of the ANN. The computations can be performed using at least one value of the second data type within the second value interval, wherein at least one value is a result of mapping of at least one value of the first value interval to a value of the second value interval. The processors may determine a measure of saturations in the one or more neurons of the ANN. The processors may then adjust, based on the measure of saturations, at least one of the first value interval and the second value interval.

The first value interval or the second value interval can be adjusted to decrease the measure of saturations in the one or more neurons. The first data type may include a floating-point data type and the second data type may include a fixed-point data type. The measure of saturations can be based on a count of the saturations in the one or more neurons.

The first value interval or the second value interval can be the same for all layers of the ANN. The first value interval or the second value interval can be different for different layers of the ANN.

The processors can compare the measure of saturations to a user input. The user input may include an acceptable measure of saturations. The processors can then proceed to adjust, based on a result of the comparison, the first value interval.

The processors can be configured to perform further computations of the one of more neurons of the ANN for the input data, determine a further measure of saturations in the one or more neurons, and perform, based on the further measure of saturations, further adjustments of the first value interval or the second value interval.

The processors can be configured to map a first value of the first interval to a second value within the second interval, wherein the second value is of the first data type. The processors can further round the second value to the closest value of the second data type, or randomly round the second value to one of two of the closest values of the second data type, or round the second value to a value of the second data type based on a static method.

Prior to computations of one or more neurons of the ANN, the processors can add or subtract an offset value to data of the first data type to map the data onto the second value interval.

Prior to performing the computations of one or more neurons of the ANN, the processors can divide the first value interval into a plurality of subintervals. For each subinterval of the plurality of subintervals, the processors can be configured to map a value of the subinterval onto a value of a further interval of a subsequent data type. The subsequent data type can include the second data type. A count of the values within the further interval of the subsequent data type can be substantially proportional to a count of input values of input data within a subinterval of the plurality of subintervals. The subintervals may include, separately, the positive values and the negative values of the first value interval. The subintervals may also be selected in a way that the union of all the subintervals does not completely cover the first value interval.

According to another embodiment, a method for performing a quantization of ANNs is provided. The method may include receiving, by one or more processors, a description of an ANN and input data associated with the ANN. The description of the ANN can be represented according to a first data type. The method may determine, by the one or more processors, a first value interval of the first data type to be mapped to a second value interval of a second data type. The method may perform, by the one or more processors and based on the input data and the description of the ANN, computations of one or more neurons of the ANN. The computations are performed for at least one value within the second value interval, wherein the at least one value is a result of mapping of at least value of the first data interval onto the second data interval. The method may determine, by the one or more processors, a measure of saturations in the one or more neurons of the ANN. The method may include adjusting, by the one or more processors and based on the measure of saturations, at least one of the first value interval or the second value interval.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and, in which.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

For purposes of this document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Embodiments of this disclosure are directed to methods and systems for quantization of ANNs without use of computations on floating point data. Embodiments of the present disclosure may facilitate selection of quantization intervals for input values, weights and other parameters of neurons in ANNs. Some embodiments of the present disclosure may allow adjustment of quantization interval individually for each layer of an ANN, filter of the ANN, or activation map of the ANN. The quantization interval can be adjusted separately for one or more ranges of the input data. The quantization interval can be adjusted to decrease the number of saturations in neurons in integer-based computations of the ANN.

While some embodiments of the present disclosure are described herein with reference to operations of FPGAs, the present technology may be also practiced with application-specific integrated circuits (ASICs), programmable logic devices, transistor-based circuits, or various combinations thereof. The methods described herein can be also implemented by hardware modules, software modules, or combinations of both. The methods can also be embodied in computer-readable instructions stored on computer-readable media.

The term "module" shall be construed to include a hardware device, software, or a combination of both. For example, a hardware-based module can use one or more microprocessors, FPGAs, application-specific integrated circuits (ASICs), programmable logic devices, transistor-based circuits, or various combinations thereof. Software-based modules can constitute computer programs, computer program procedures, computer program functions, and the like. In addition, a module of a system can be implemented by a computer or server, or by multiple computers or servers interconnected into a network. Alternatively, a module may refer to a subpart of a computer system, a hardware device, an integrated circuit, or a computer program.

Technical effects of certain embodiments of the present disclosure can include increasing accuracy of fixed-point ANN computations. Further technical effects of certain embodiments of the present disclosure can allow decreasing saturations of neurons in fixed-point ANN computations.

Referring now to the drawings, exemplary embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

Figure 1:
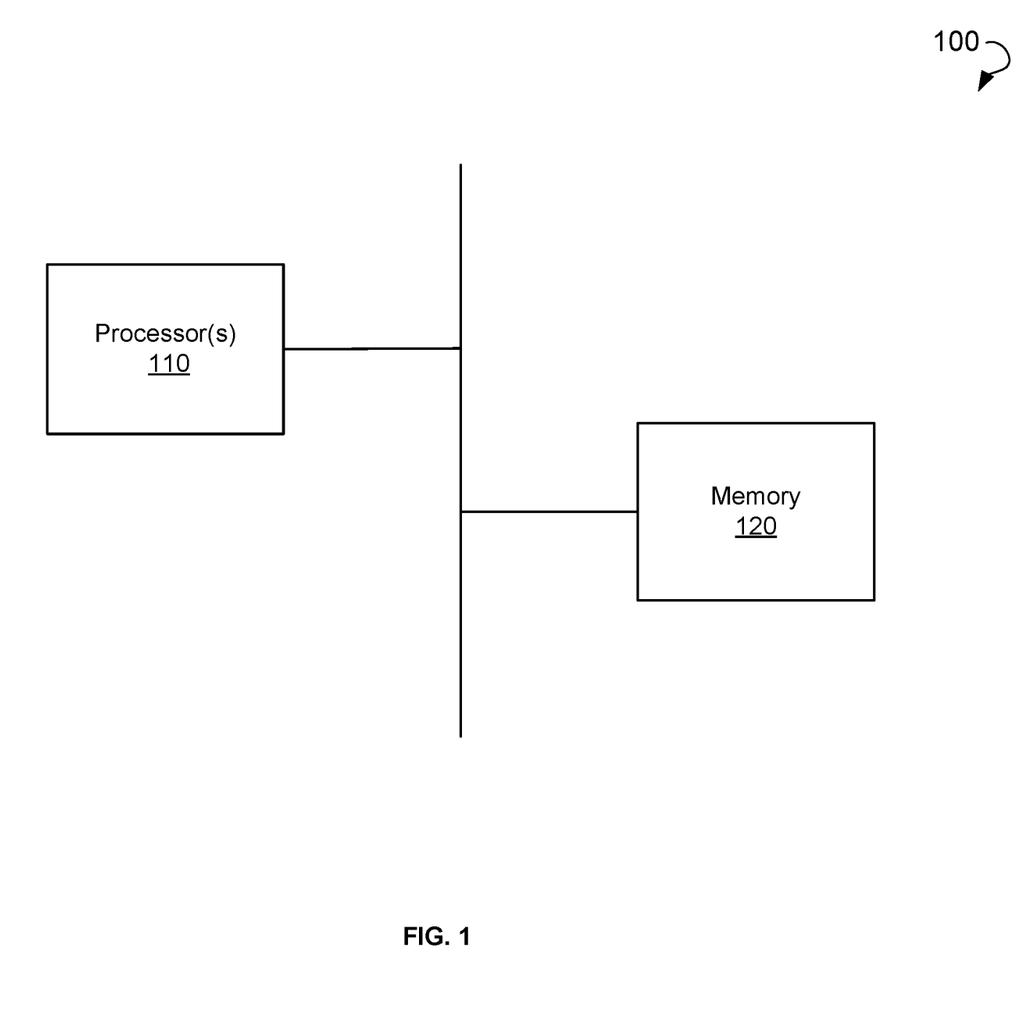
FIG. 1 is a block diagram showing an example system for quantization data in ANN computations, according to some example embodiments.

FIG. 1 is a block diagram showing an example system 100 for quantization of ANNs, according to some example embodiments. The system 100 can be part of a computing system, such as a personal computer, a server, a cloud-based computing recourse, and the like. The system 100 may include on or more processor(s) 110 and a memory 120. The memory 120 may include computer-readable instructions for execution by the processor(s) 110. The processor(s) 110 may include a programmable processor, such as a microcontroller, central processing unit (CPU), and so forth. In other embodiments, the processor(s) 110 may include an application-specific integrated circuit(s) or programmable logic array(s), such as an FPGA(s), designed to implement the functions performed by the system 100. In various embodiments, the system 100 may be installed on a remote server or may be provided as a cloud service residing in a cloud storage.

The processor(s) 110 may be configured to receive a structure and parameters of an ANN and input datasets for the ANN. The parameters of the ANN and the input datasets can be presented in a first data type. The processor(s) 110 may be further configured to select a first value interval of the first data type to be mapped to a second value interval of a second data type. The processor(s) 110 can be further configured to perform, based on the input data, computations of one or more neurons of the ANN, wherein the computations are performed using at least one value within the second value interval of the second data type. The value within the second value interval can be a result of mapping of at least one input from the input datasets to the second interval. The processor(s) 110 can be further configured to determine a measure of saturations in the neurons of the ANN. The processor(s) 110 can be further configured to adjust, based on the measure of saturations, the first value interval of the first data type and/or the second data type of the of the data types.

In embodiments of the present disclosure, computation of a neuron of the ANN using values of the second data type may require less operations of the processor(s) 110 than the computation of the same neuron of the ANN using values of the first data type. The input datasets presented using the second data type may require less memory to be stored than the same input datasets presented using the first data type. While, for simplicity, some embodiments of the present disclosure deal with real numbers as the first data type and integers as the second data type, similar methods can be used for mapping and quantization of data using another first data type and another second data type. For example, the first data type may include floating point real numbers and the second data type may include fixed-point real numbers. In another example, the first data type can include double precision floating point numbers and the second data type may include single precision floating-point numbers. In another example, the first data type may include 32-bit floating point numbers and the second data type may include 8-bit integers. In yet another example, the first data type may include 8-bit integers and the second data type may include 4-bit integers.

Figure 2:
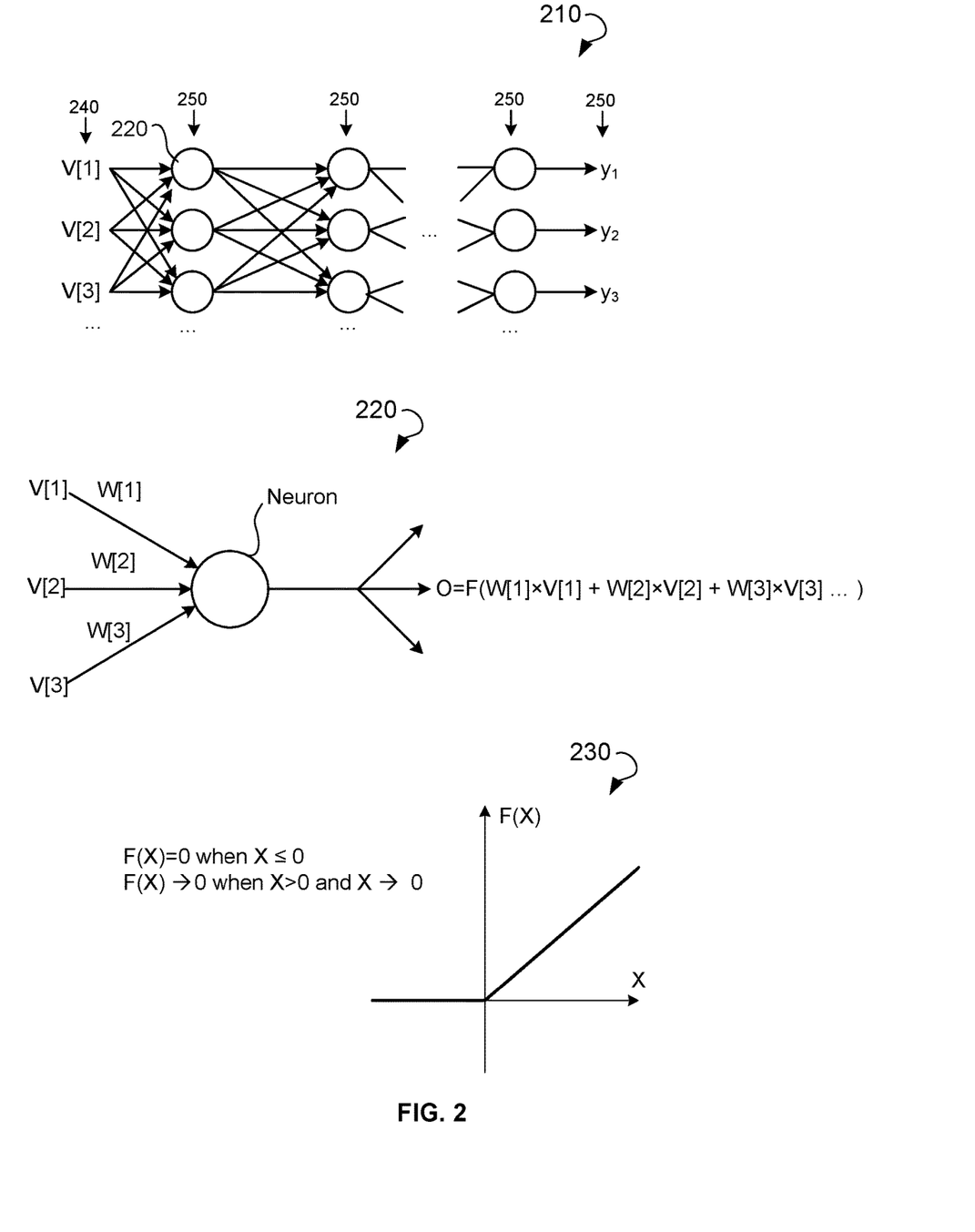
FIG. 2 shows an ANN, neuron, and transfer function, according to an example embodiment.

FIG. 2 shows ANN 210, neuron 220, and transfer function 230, according to some example embodiments. The ANN 210 may include one or more input layers 240, one or more hidden layers 250, and one or more output layers 260. Each of the input layers, hidden layers, and output layers may include one or more (artificial) neurons 220. The number of neurons can be different for different layers.

Each of neurons 220 may be represented by a calculation of a mathematical function $$O = F\left(\sum_{i=1}^{n} V[i] \times W[i]\right) \quad (1)$$

wherein V[i] are neuron input values, W[i] are weights assigned to input values at the neuron, and F(X) is a transfer function. Typically, the transfer function 230 F(X) is selected to be zero for X<0 and have a limit of zero as X approaches zero. For example, the transfer function F(X) can be in the form of a sigmoid. The result of the calculation of a neuron propagates as an input value of further neurons in the ANN. The further neurons can belong to either the next layer, previous layer or the same layer.

It should be noted that while the ANN 210 illustrated in FIG. 2 can be referred to as a feedforward neural network, embodiments of the present disclosure can be also used in computations of convolution neural networks, recurrent neural networks, long short-term memory networks, and other types of ANNs.

Figure 3A:
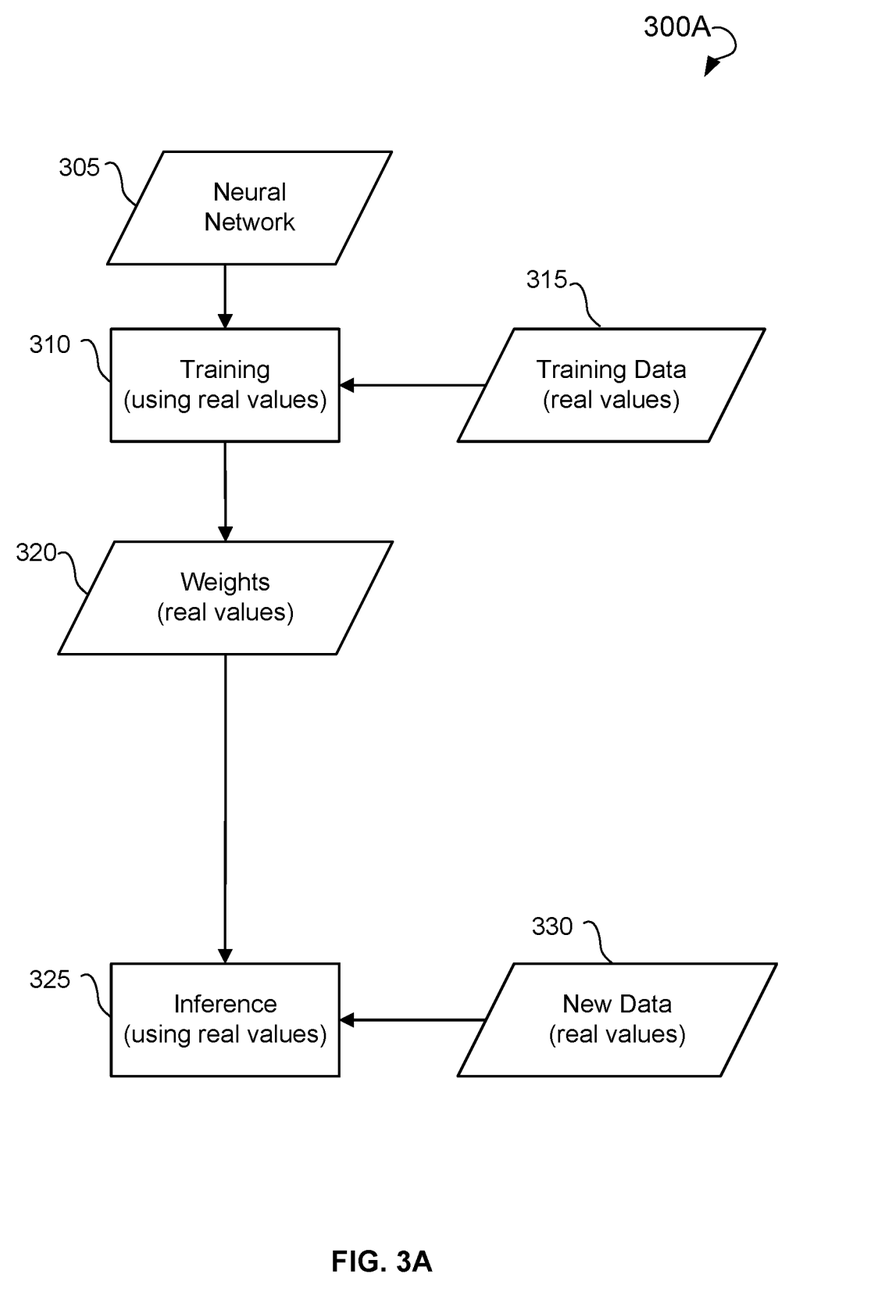
FIG. 3A is a flow chart showing training and inference of an ANN performed with the same data type, according to some example embodiments.

FIG. 3A is a flow chart showing a workflow 300A for training 310 and inference 325 of an ANN, according to some example embodiments. The training 310 (also known as learning) is a process of teaching ANN 305 to output a proper result based on a given set of training data 315. The process of training may include determining weights 320 of neurons of the ANN 305 based on training data 315. The training data 315 may include samples. Each sample may be represented as a pair of input values and expected output. The training data 315 may include hundreds to millions of samples. While training 310 is required to be performed only once, it may require a significant amount of computations and may take a considerable time.

The ANNs can be configured to solve different tasks including, for example, image recognition, speech recognition, handwriting recognition, machine translation, social network filtering, video games, medical diagnosis, and so forth.

The inference 325 is a process of computation of an ANN. The inference 325 uses the trained ANN weights 320 and new data 330 including new sets of input values. For each new set of input values, the computation of the ANN provides a new output which answer the problem that the ANN is supposed to solve. For example, an ANN can be trained to recognize various animals in images. Correspondingly, the ANN can be trained using millions of images of animals. Submitting a new image to the ANN would provide the information concerning animals in the new image (this process being known as image tagging). While the inference for each image takes fewer computations than training, the number of inferences can be large because new images can be received from billions of sources.

The inference 325 includes multiple computations of sum of the following products:

$$\sum_{i=1}^{n} V[i] \times W[i] \quad (2)$$

wherein the V[i] are new input values and W[i] are weights associated with neurons of the ANN.

It should be noted that both training 310 and inference 325 in FIG. 3A are performed using computations based on the same type of data, for example, real values in floating-point format. Performing inference for large number of input datasets of new data 330 using floating-point calculations can be time consuming and may require significant computing resources for computations of an ANN.

In some embodiments, the inference of an ANN be performed using integer-based or fixed-point calculations in order to reduce computation time and computing resources required to perform ANN computations. To perform integer-based inference, real (floating point) values of input data and weights associated with the ANN can be quantized. Generally, quantization can be referred to as a process of reduction of the number of bits that represent a real value number. For example, the quantization may include converting 32-bit floating point numbers into 8-bit integers. The quantization may significantly reduce bandwidth of ANN computations and memory storage required to store input data, weights, and intermediate results of a layer of the ANN.

Figure 3B:
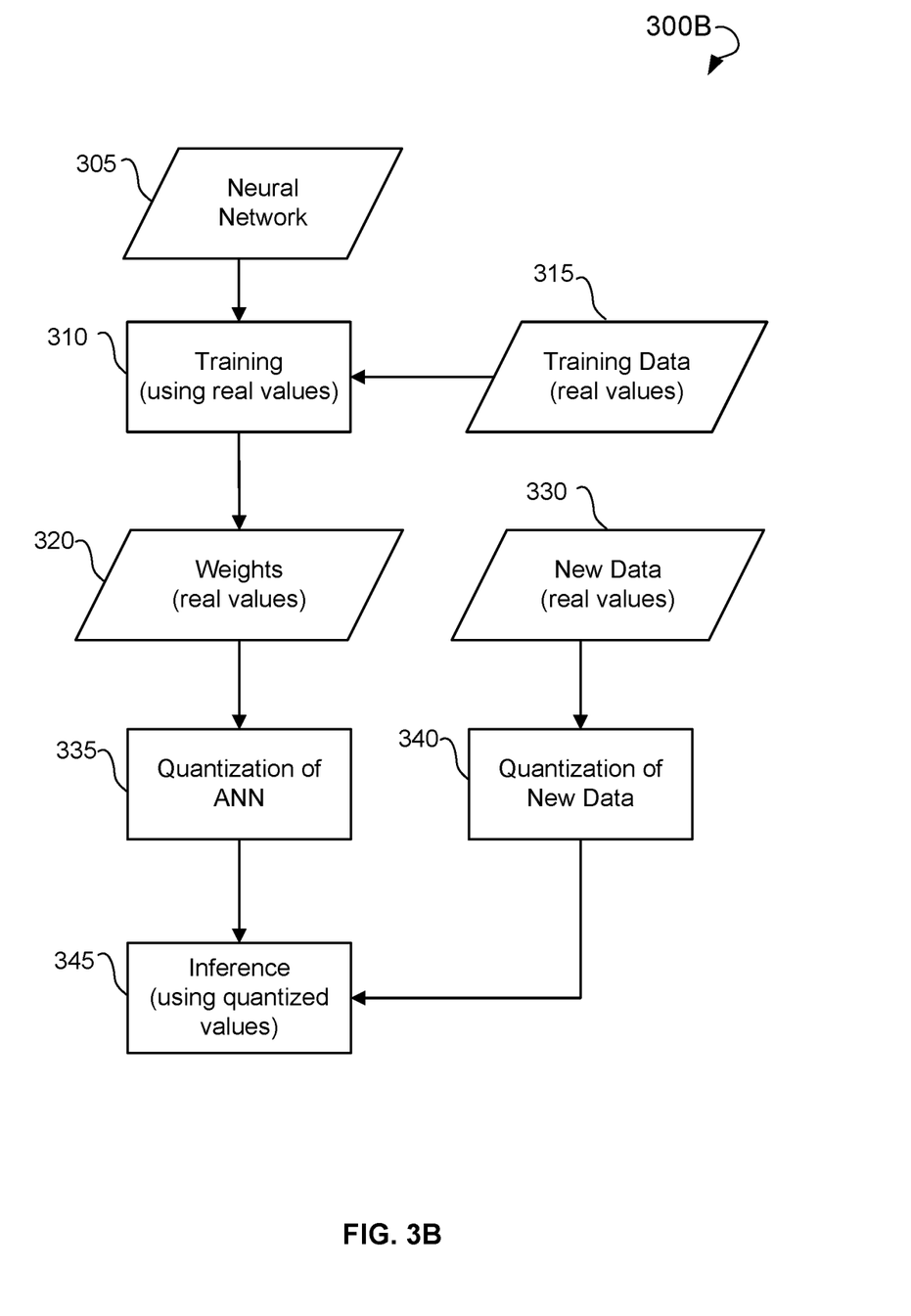
FIG. 3B is a flow chart showing training and inference of an ANN using different data types, according to some example embodiments.

FIG. 3B is a flow chart showing a workflow 300B of training 310 and inference 345 of an ANN using different data types for training and inference, according to some example embodiments. The training 310 can be performed using training data 315. The training data 315 can be of a first data type, for example real values in the floating-point format. The process of training may include determining weights 320 of neurons of the ANN 305. The weights 320 can be also of the first data type.

After determination of the weights 320 in the first data type, the weights 320 and other parameters of ANN can be quantized in quantization 335. The weights 320 can be mapped to a set including a pre-determined number of values of a second data type. For example, the second data type may include integers. The inference 345 can be further performed using the quantized values for the weights 320. Prior to the inference 345, each input dataset in new data 330 can be also quantized, that is mapped to the values of the second data type, in quantization 340 using the same quantization workflow as in the quantization 335. Since the weights 320 and the input sets of new data 340 are quantized and converted to the second data type, the inference 345 can be performed using hardware configured to perform computations using only second data type. The computations using the second data type may require less time and memory resources than the same computations using the first data type. However, the result of the inference 345 performed using second data type can be less accurate than the result of inference 325 performed using the first data type used in the training of ANN. It should be noted that the quantization differs from a simple data mapping because the quantization of a value of the first data type may result in a different value of the second data type.

Figure 4A:
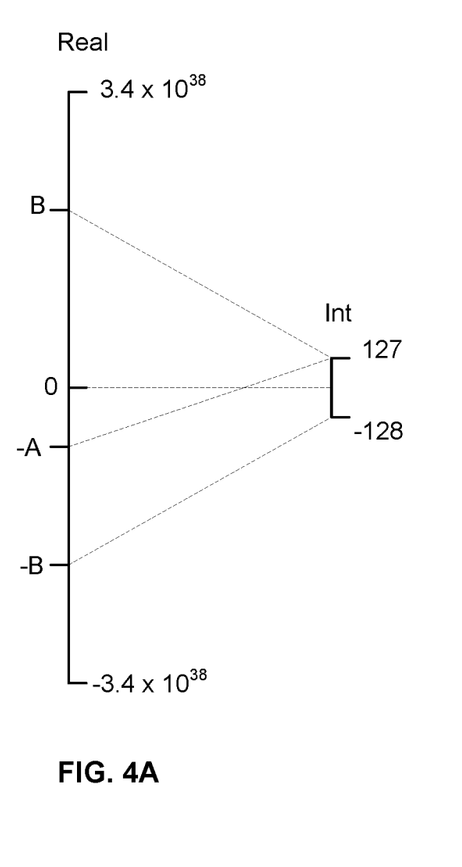
FIG. 4A is a schematic diagram showing an example quantization of input data in ANN, according to some example embodiments.

FIG. 4A shows a simplified schematic of example quantization of input data in an ANN, according to some example embodiments. In FIG. 4A, the real value data associated with ANN, for example input values for a layer, are located within value range [−B, −A]. While in example of the FIG. 4A, the value range is shown below zero, in general, the value range of input data can include an interval with only positive values, both positive and negative input values, and zero value. The values within the value range can be divided into intervals $(t_i, t_{i+1}]$, i=1, . . . , L, wherein L is number of integers representing the input values. The intervals $(t_i, t_{i+1}]$ can be equal in length. The length of $(t_i, t_{i+1}]$ is referred to as a quantization interval or a quantization step. All input data within the same interval $(t_i, t_{i+1}]$ can be mapped to an integer i. In the example shown in FIG. 4A, the input data in interval [−B; −A] are real values 32-bit floating point data. The input data in [−B; −A] are represented by 8-bit integers between −128 to +127. Typically, a range to be quantized is selected to be symmetrical with respect to 0. In the example shown in FIG. 4A, the range [−B; +B] can be selected to include the input data from the range [−B; −A].

Figure 4B:
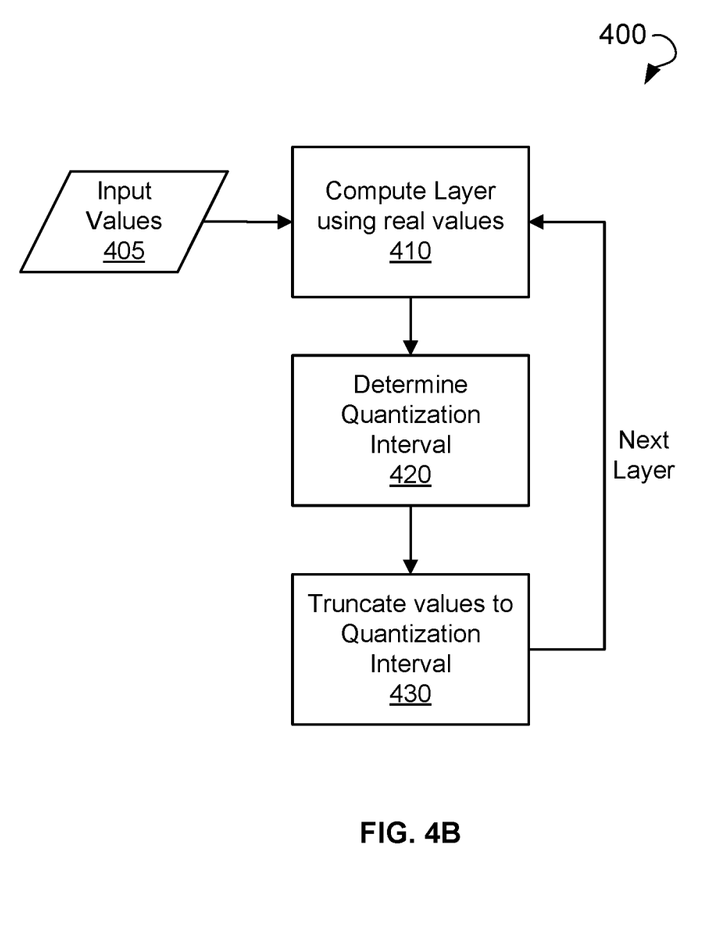
FIG. 4B is a flow chart showing steps of a method for quantization of ANN, according to an example embodiment.

FIG. 4B is a block diagram showing a method 400 for quantization of ANNs, according to some embodiments. The method 400 may correspond to some current approaches used for quantization of ANNs. The method 400 can be implemented using the system 100 described above with reference to FIG. 1.

The method 400 may commence, in block 410, with computing a layer of ANN. The computations of neurons of the layer is performed using real values for input data 405. In block 420, the method 400 may determine, based on the result of commutation of the layer, a quantization interval. The weights of the neurons can be converted to integer values once after the ANN is trained using real values. The quantization interval can be determined per layer, because input data for the different layers can be of different range. The quantization interval for a layer can be determined based on the maximum and minimum values for the input values 405 for the layer. The range of values to be quantized can be selected to be symmetrical with respect to zero as shown in FIG. 4A.

In block 430, the method 400 may truncate real values (weights and input data) to integers values (or fix-point values). Once the ANN is quantized, an inference of the ANN can be performed for other sets of input data. The inference of the ANN can be performed using integer values for weights of neurons. The input data for each layer of the ANN can be converted to integer values based on the quantization interval determined for the layer. The accuracy of the result of the inference of the ANN performed using integer values and integer-based operation depends on whether a quantization interval is selected accurately. The accuracy of results of ANN computations using integer values may also depend on a method for mapping the real values to integer values.

Figure 5:
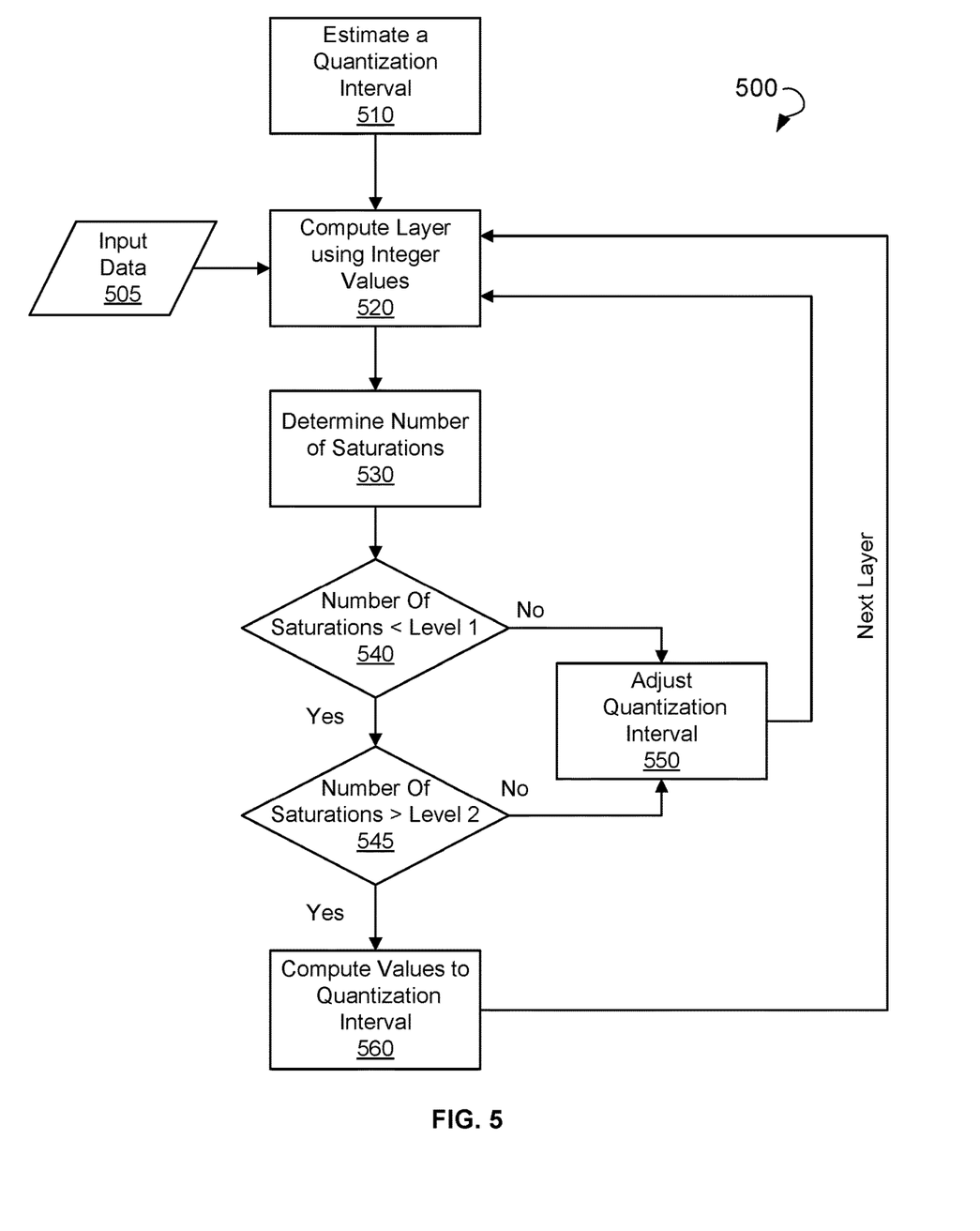
FIG. 5 is a flow chart showing steps of method for quantization of ANN, according to some other example embodiments.

FIG. 5 is a flow chart, showing a method 500 for quantization of the ANN, according to some embodiments of the present disclosure. The method 500 may be performed by the system 100 described above with reference to FIG. 1. The method 500 can be used to determine a quantization interval and a workflow for mapping of real values from the quantization interval to integer values individually for each layer of the ANN.

The method 500 may commence, in block 510, with estimating an initial value for a quantization interval. For example, the quantization interval can be estimated based on the average value of quantization intervals determined for previous layers. The quantization interval can be also determined by method 400 as described above with reference to FIG. 4.

In block 520, the method 500 may compute layer of the ANN using input data 505. The input data 505 can be quantized based on the quantization interval. The computations of the layer can be performed using integer values representing the input data 505.

In block 530, the method 500 may determine a number of saturations in neurons of the layer. A neuron is said to be saturated if output values of the neuron are close to the asymptotic end of the transfer function F(X). In integer computations, the neuron is said to be saturated if an output of the neuron is close to the boundary of the integer values, for example −128 or 127 if 8-bit integers are used.

In decision block 540, the method 500 may compare the number of saturations to a first pre-determined level. If the number of saturations exceeds the first pre-determined level, method 500 proceeds to block 550 with an adjustment of the quantization interval.

In decision block 545, the method 500 may compare the number of saturations to a second pre-determined threshold. If the number of saturations does not exceed the second pre-determine threshold, the method 500 proceeds to block 550 with an adjustment of the quantization interval. The quantization interval can be adjusted to bring the number of neuron saturations between the second pre-determined level and the first pre-determined level. In other embodiments, the method 500 may determine, in block 530, a proportion of the saturations (a ratio of saturated neurons to the number of all neurons in the layer). The proportion of the saturations can be further used in blocks 540 and 545 for comparison with the first pre-determined threshold and the second pre-determined threshold, respectively.

The method 500 may further proceed with computing the layer using integer values for weights of neurons and input data 505, wherein integer values are determined based on the adjusted quantization interval. Steps 550, 520, 530, 540, and 545 can be repeated until the number of saturations are between the second pre-determined level and the first pre-determined level or number of iterations for the steps exceeding a pre-determined maximum number.

If the number of saturations is between the second pre-determined level and the first pre-determined level, method 500 proceeds, in block 560, with computations of integer values for weights of neurons of the layer. The method 500 may further determine a quantization interval for the next layer of the ANN.

While steps of method 500 are described with reference to layers, a similar method can be applied to determine a single quantization interval for entire ANN (one quantization interval to be used for layers in the ANN) or multiple ANNs. In these cases, the number of saturations is determined for neurons in all layers of the ANN or multiple ANNs.

It should be noted that a fundamental difference between the method 500 of FIG. 5 and the method 400 of FIG. 4 is that the method 500 does not require knowledge of the original interval of input data in the first data type (for example real numbers) for any of the layers of the ANN. Therefore, the method 500 does not require computations involving data in the first data type. The method 500 can be performed on hardware configured to perform only reduced precision calculations. The reduced precision calculations may include calculations using only the second data type, for example fixed-point calculations and/or integer calculations.

Similarly, a method 500 can be used to determine a quantization interval individually for each filter and/or each activation map in a convolution neural network if the number of saturations is determined per filter or per activation map.

Figure 6:
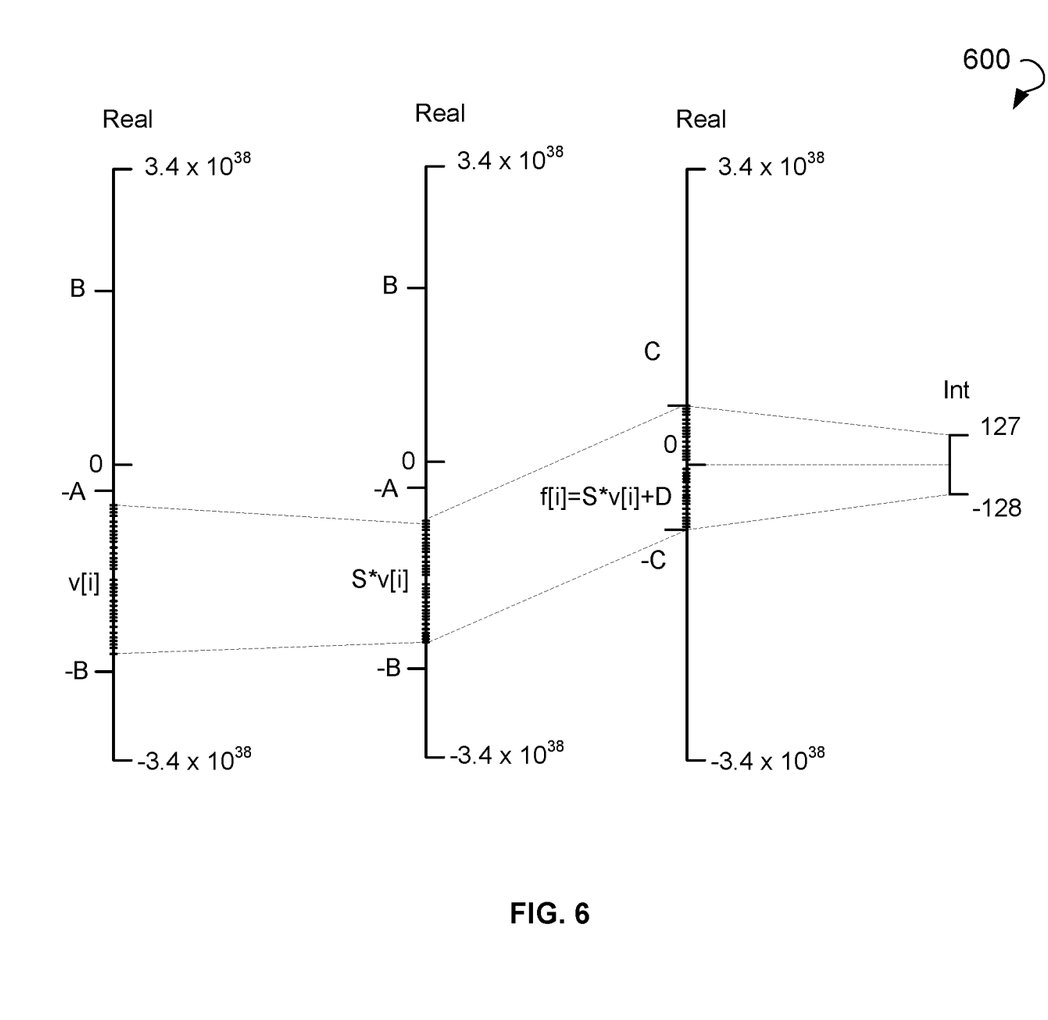
FIG. 6 is a schematic diagram showing an example quantization of input data in ANN, according to some example embodiments.

FIG. 6 is schematic diagram showing a workflow 600 for adjustment of a quantization interval, according to some example embodiments of the present disclosure. In example of FIG. 6, input values v[i] are located in interval [−B; −A]. If the range of the quantization is selected as [−B; B] and the range [−B; B] is divided into equal intervals, then the input data will be represented only by a part of integers, which may lead to loss of the precision in ANN computations. Therefore, prior quantization, the input values v[i] can be optionally scaled by a factor S, and then shifted by a shift D to position the range of the input values v[i] symmetrically with respect to zero. As a result, all data are transformed into a new range [−C; C]. The range [−C; C] can be further divided into L equal intervals of a length of quantization step Q, wherein L is the number of integers used to represent the input data v[i]. The input value f[i]=S*v[i]+D can be mapped to integer k closest to the value (S*f[i]+C)/Q. In other embodiments, the input value f[i]=S*v[i]+D can be randomly rounded to one of two integers k or k+1 closest to the value (S*f[i]+C)/Q.

Figure 7:
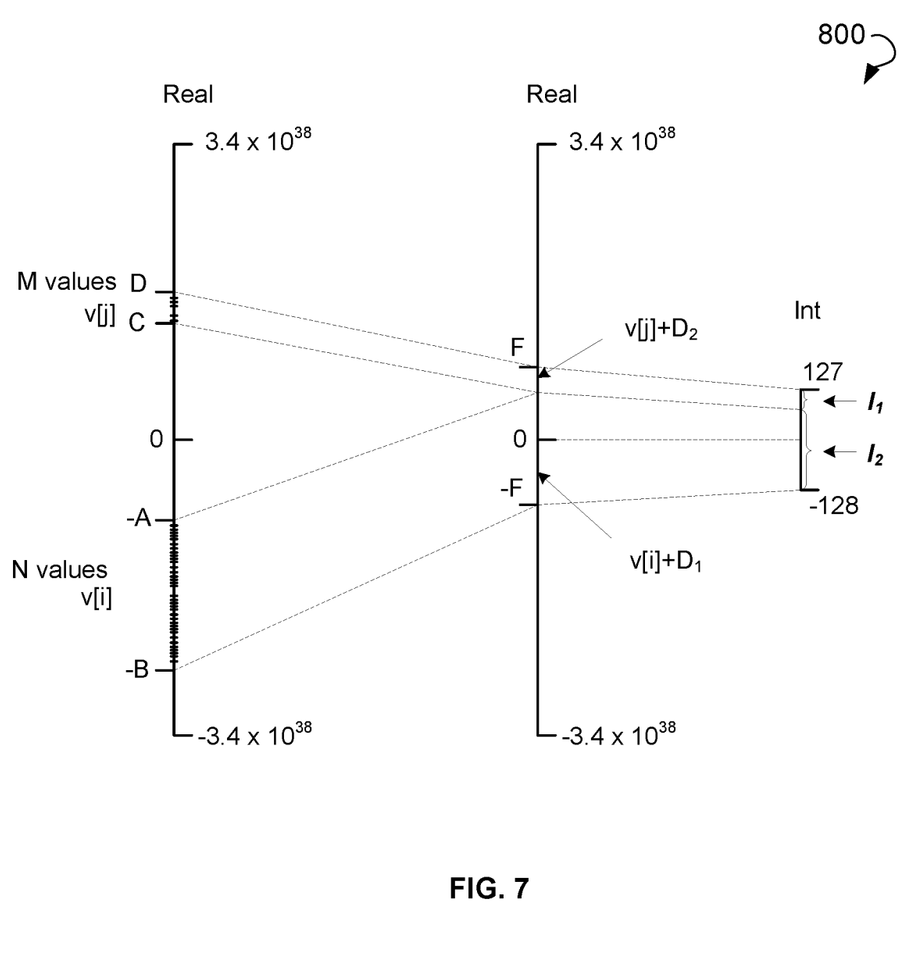
FIG. 7 is a schematic diagram showing an example quantization of input data in ANN using multiple quantization intervals, according to some example embodiments.

FIG. 7 is schematic diagram showing a workflow 700 for adjustment of a quantization interval for ANNs, according to some example embodiments of the present disclosure. In example of FIG. 7, input values are located within two subintervals [−B; −A] and [C; D]. The subintervals [−B; −A] and [C; D] may include different numbers of input values. For example, the subintervals [−B; −A] may include M input values v[j] and subinterval [C; D] may include N input values, wherein M>N. The values −A, −B, C and D can be positive or negative.

In one example embodiments, prior to the quantization, the input values in ranges [−B; −A] and [C; D] can be shifted by different shifts $D_1$ and $D_2$. In some embodiments, after being shifted, ranges [−B; −A] and [C; D] can form a new range [−F; F]. The new range [−F; F] can be further divided into L intervals $(t_k, t_{k+1})$, k=1, . . . , L, wherein L is a number of integers used to represent both the input values v[i] and the input values v[j]. The input values v[i] and input values v[j] can be further mapped to integer values according to quantization levels assigned to intervals $(t_k, t_{k+1})$, k=1, . . . , L.

In some other embodiments, a number of integers representing input values v[i] and a number of integers representing input values v[j] can be selected to be proportional to number M of input values v[i] and number N of input values v[j], respectfully. For example, subinterval [−B; −A] can be divided into $L_1$ intervals and range [C; D] can be divided into $L_2$ intervals, wherein $L_1$=L×M/(M+N) and $L_2$=L×N/(M+N) and L is number of integers representing all input values from both the subinterval [−B; −A] and subinterval [C, D]. A quantization step for the subinterval [−B, −A] can be different than a quantization step for the subinterval [C, D]. The input values v[i] from the subinterval [−B; −A] can be mapped to a first subset of integers $I_1$ and the input values v[i] from the subinterval [−B; −A] and be mapped to a second subset of integers $I_2$.

In general, an adjustment of a quantization interval may include determining one or more ranges of input values to be quantized and numbers of input values within the ranges. Quantization steps and quantization levels for the ranges can be further determined based on numbers of the input values within the ranges. The numbers of the quantization levels for the ranges can be selected to be proportional to the numbers of the input values within the ranges.

Figure 8:
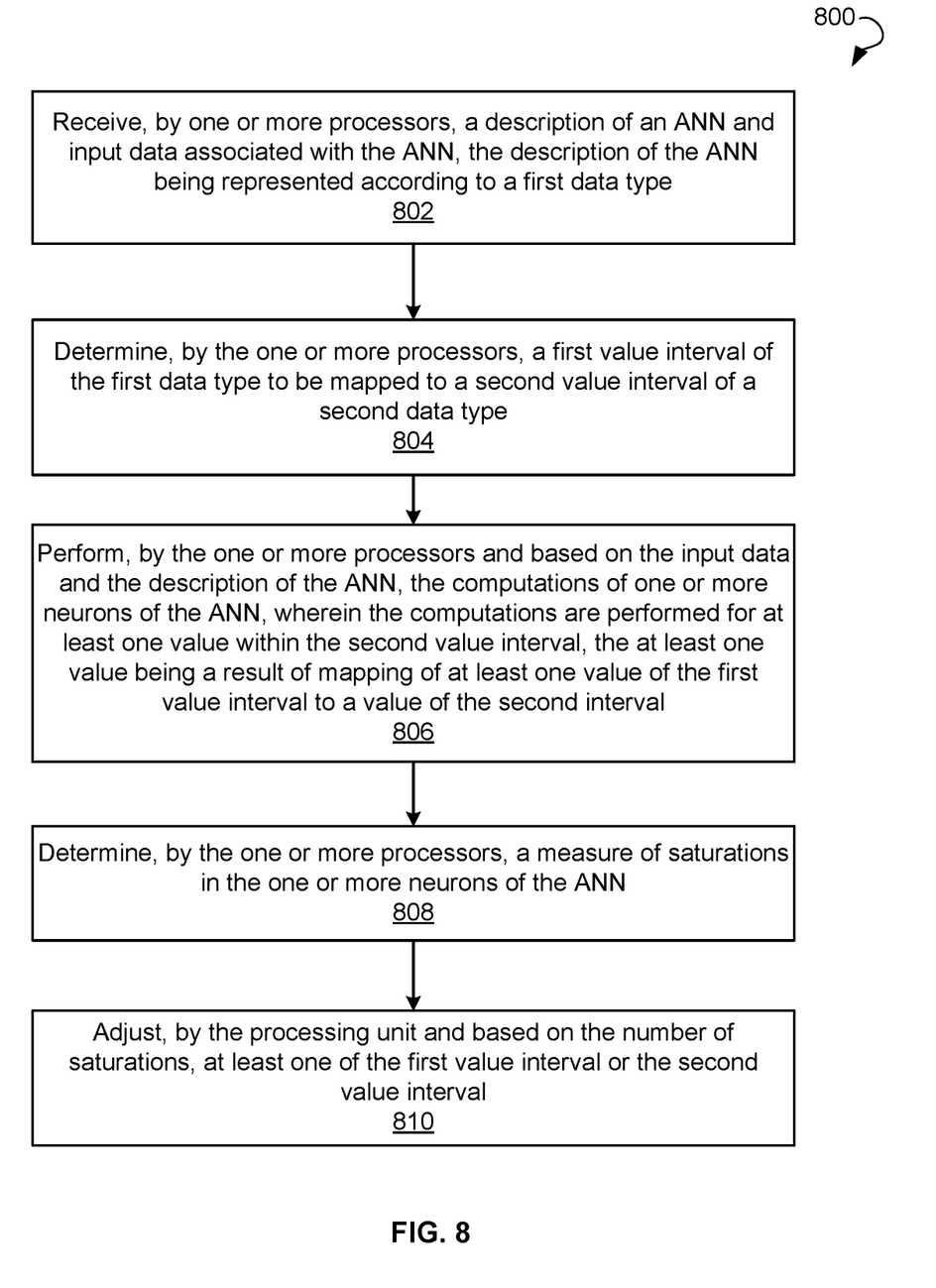
FIG. 8 is a flow chart showing steps of a method for quantization of ANN data, according to some example embodiments.

FIG. 8 is a flow chart illustrating a method 800 for quantization of ANNs, in accordance with some example embodiments. In some embodiments, the operations can be combined, performed in parallel, or performed in a different order. The method 800 may also include additional or fewer operations than those illustrated. The method 800 may be performed by the system 100 described above with reference to in FIG. 1.

In block 802, the method 800 may commence with receiving, by one or more processors, a description of an ANN and input data associated with the ANN, wherein the description of the ANN is represented according to a first data type. The description of the ANN may include parameters of the ANN, for example weights.

In block 804, the method 800 may determine, by the one or more processors, a first value interval of the first data type to be mapped to a second value interval of a second data type. The first data type may include a floating-point data type and the second data type may include a fixed-point data type.

In block 806, the method 800 may perform, by the one or more processors and based on the input data and the description of the ANN, computations of one or more neurons of the ANN. The computations are performed for at least one value within the second value interval, wherein the at least one value is a result of mapping of at least one of the first value interval to a value of the second value interval.

In block 808, the method 800 may determine, by the one or more processors, a measure of saturations in the one or more neurons of the ANN. The measure of saturations can be based on a count of saturations in all neurons of the ANN or based on a count of saturations in neurons belonging to a subset of layers of the ANN.

In block 810, the method 800 may proceed with adjusting, by the one or more processors and based on the measure of saturations, at least one of the first value interval or the second value interval.

Figure 9:
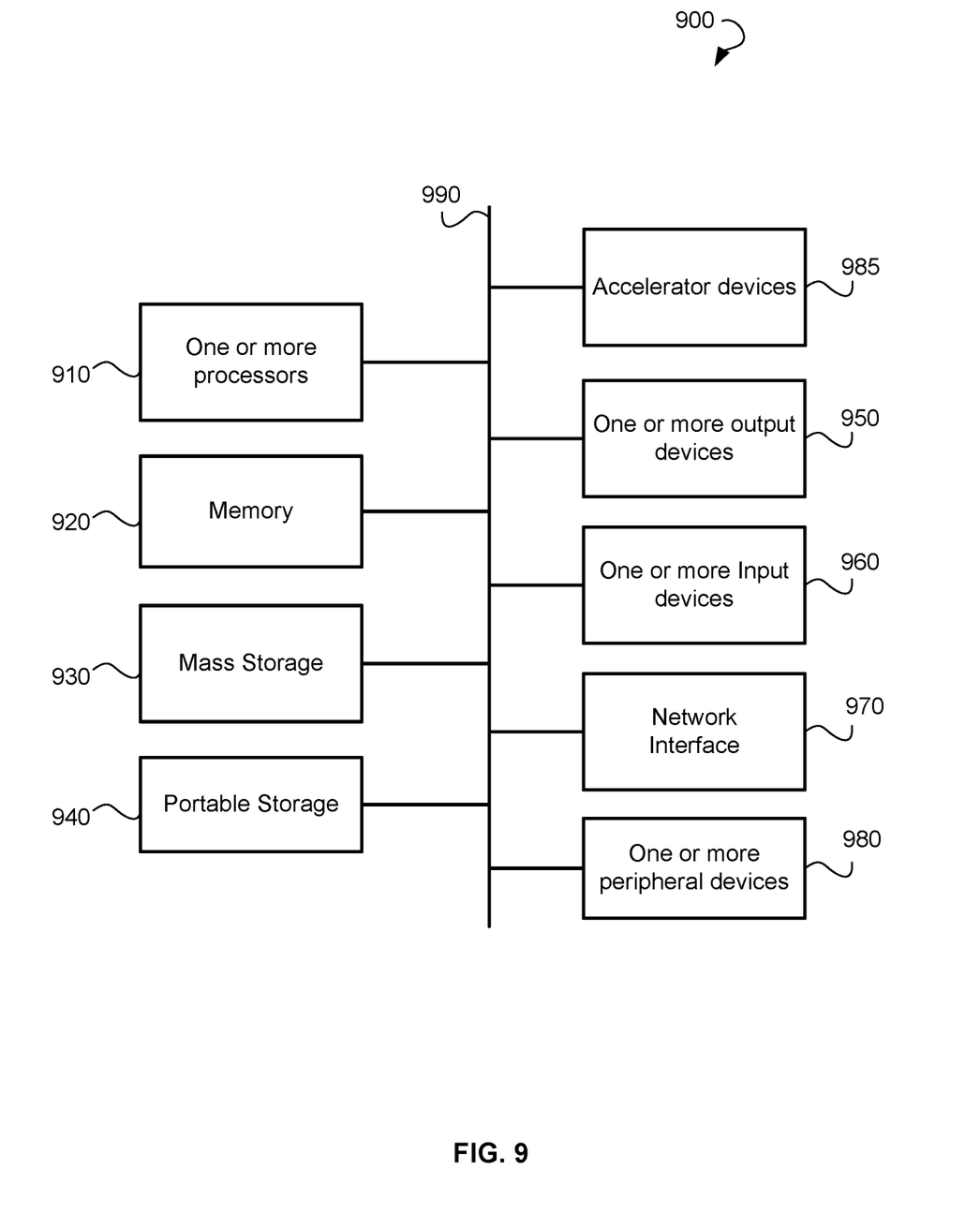
FIG. 9 shows a computing system that can be used to implement embodiments of the disclosed technology.

FIG. 9 illustrates an example computing system 900 that may be used to implement embodiments described herein. The example computing system 900 of FIG. 9 may include one or more processors 910 and memory 920. Memory 920 may store, in part, instructions and data for execution by the one or more processors 910. Memory 920 can store the executable code when the exemplary computing system 900 is in operation. The processor 910 may include internal accelerators like a graphical processing unit, a Field Programmable Gate Array, or similar accelerators that may be suitable for use with embodiments described herein. The memory 920 may include internal accelerators like a graphical processing unit, a Field Programmable Gate Array, or similar accelerators that may be suitable for use with embodiments described herein. The example computing system 900 of FIG. 9 may further include a mass storage 930, portable storage 940, one or more output devices 950, one or more input devices 960, a network interface 970, and one or more peripheral devices 980.

The components shown in FIG. 9 are depicted as being connected via a single bus 990. The components may be connected through one or more data transport means. The one or more processors 910 and memory 920 may be connected via a local microprocessor bus, and the mass storage 930, one or more peripheral devices 980, portable storage 940, and network interface 970 may be connected via one or more input/output buses.

Mass storage 930, which may be implemented with a magnetic disk drive, an optical disk drive or a solid state drive, is a non-volatile storage device for storing data and instructions for use by a magnetic disk, an optical disk drive or SSD, which in turn may be used by one or more processors 910. Mass storage 930 can store the system software for implementing embodiments described herein for purposes of loading that software into memory 920. The mass storage 930 may also include internal accelerators like a graphical processing unit, a Field Programmable Gate Array, or similar accelerators that may be suitable for use with embodiments described herein.

Portable storage 940 may operate in conjunction with a portable non-volatile storage medium, such as a compact disk (CD) or digital video disc (DVD), to input and output data and code to and from the computing system 900 of FIG. 9. The system software for implementing embodiments described herein may be stored on such a portable medium and input to the computing system 900 via the portable storage 940.

One or more input devices 960 provide a portion of a user interface. The one or more input devices 960 may include an alphanumeric keypad, such as a keyboard, for inputting alphanumeric and other information, or a pointing device, such as a mouse, a trackball, a stylus, or cursor direction keys. Additionally, the computing system 900 as shown in FIG. 9 includes one or more output devices 950. Suitable one or more output devices 950 include speakers, printers, network interfaces, and monitors.

Network interface 970 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 970 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 980 may include any type of computer support device to add additional functionality to the computing system. The one or more peripheral devices 980 may include a modem or a router.

The example computing system 900 of FIG. 9 may also include one or more accelerator devices 985. The accelerator devices 985 may include PCIe-form-factor boards or storage-form-factor boards, or any electronic board equipped with a specific electronic component like a Graphical Processing Unit, a Neural Processing Unit, a Multi-CPU component, a Field Programmable Gate Array component, or similar accelerators electronic or photonic components, that may be suitable for use with embodiments described herein.

The components contained in the exemplary computing system 900 of FIG. 9 are those typically found in computing systems that may be suitable for use with embodiments described herein and are intended to represent a broad category of such computer components that are well known in the art. Thus, the exemplary computing system 900 of FIG. 9 can be a personal computer, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, SSD, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. The instructions or data may not be used by the CPU but be accessed in writing or reading from the other devices without having the CPU directing them.

Thus, systems and methods for quantization of ANNs have been described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for performing a quantization of artificial neural networks (ANNs), the system comprising one or more processors configured to:
   receive a description of an ANN and input data associated with the ANN, the description of the ANN being represented according to a first data type;
   determine a first value interval of the first data type to be mapped to a second value interval of a second data type;
   map at least one value of the input data and the description of the ANN into the second value interval to obtain at least one value of the second data type within the second interval;
   replace the at least one value in the input data and the description of the ANN with the at least one value of the second data type to obtain modified input data and a modified description of the ANN;
   perform, based on the modified input data and the modified description of the ANN, the computations of outputs of one or more neurons of the ANN;
   determine, based on the outputs of one or more neurons of the ANN, a measure of a quantity of saturations among the outputs of the one or more neurons of the ANN; and
   adjust, based on the measure of the quantity of saturations, at least one of the first value interval and the second value interval.

2. The system of claim 1, wherein the at least one of the first value interval and the second value interval is adjusted to decrease the measure of the quantity of saturations in the one or more neurons.

3. The system of claim 1, wherein the first data type is a floating-point data type and the second data type is a fixed-point data type.

4. The system of claim 1, wherein the measure of the quantity of saturations is the number of the saturated neurons in the one or more neurons.

5. The system of claim 1, wherein the one or more processors is configured to:
   compare the measure of the quantity of saturations to a user input, the user input including an acceptable measure of saturations; and adjust, based on a result of the comparison, the at least one of the first value interval and the second value interval.

6. The system of claim 1, wherein the one or more processors is configured to:
perform further computations of the one of more neurons of the ANN for the input data;
determine a further measure of the quantity of saturations in the one or more neurons; and
perform, based on the further measure of the quantity of saturations, further adjustments of the at least one of the first value interval and the second value interval.

7. The system of claim 1, wherein the at least one of the first value interval and the second value interval is the same for all layers of the ANN.

8. The system of claim 1, wherein the at least one of the first value interval and the second value interval are different for different layers of the ANN.

9. The system of claim 1, wherein the one or more processors are configured to:
map a first value of the first interval to a second value within the second interval, wherein the second value is of the first data type; and
round the second value to a value of the second data type.

10. The system of claim 1, wherein prior to performing the computations of one or more neurons of the ANN, the one or more processors add or subtract an offset value to data of the first value interval to map the data onto the second value interval.

11. The system of claim 1, wherein prior to performing the computations of one or more neurons of the ANN, the one or more processors are configured to:
divide the first value interval into a plurality of subintervals; and
for each subinterval of the plurality of subintervals, map a value of the subinterval onto a value of a further interval of a subsequent data type.

12. The system of claim 11, wherein the subsequent data type is the second data type.

13. The system of claim 11, wherein a count of the values within the further interval of the subsequent data type is proportional to a count of input values of input data within a subinterval of the plurality of subintervals.

14. The system of claim 1, wherein the one or more processors include at least one electronic component accelerating the computation of the one or more neurons of the ANN.

15. A method for performing a quantization of artificial neural networks (ANNs), the method comprising:
receiving, by one or more processors, a description of an ANN and input data associated with the ANN, the description of the ANN being represented according to a first data type;
determining, by the one or more processors, a first value interval of the first data type to be mapped to a second value interval of a second data type;
mapping at least one value of the input data and the description of the ANN into the second value interval to obtain at least one value of the second data type within the second interval;
replacing the at least one value in the input data and the description of the ANN with the at least one value of the second data type to obtain modified input data and a modified description of the ANN;
performing, by the one or more processors and based on the modified input data and the modified description of the ANN, the computations of outputs of one or more neurons of the ANN;
determining, by the one or more processors and based on the outputs of one or more neurons of the ANN, a measure of a quantity of saturations among the outputs of the one or more neurons of the ANN; and
adjusting, by the one or more processors and based on the measure of the quantity of saturations, at least one of the first value interval and the second value interval.

16. The method of claim 15, wherein the at least one of the first value interval and the second value interval is adjusted to decrease the measure of the quantity of saturations in the one or more neurons.

17. The method of claim 15, wherein the first data type is a floating-point data type and the second data type is a fixed-point data type.

18. The method of claim 15, wherein the measure of the quantity of saturations is the number of the saturated neurons in the one or more neurons.

19. The method of claim 15, further comprising, prior to performing the computations of one or more neurons of the ANN:
dividing, by the one or more processors, the first value interval into a plurality of subintervals; and
for each subinterval of the plurality of subintervals, mapping a value of the subinterval onto a value of a further interval of a subsequent data type.

20. A system for performing a quantization of artificial neural networks (ANNs), the system comprising:
one or more processors; and
a memory communicatively coupled with the one or more processors, the memory storing instructions which when executed by the one or more processors perform a method comprising:
receiving a description of an ANN and input data associated with the ANN, the description of the ANN being represented according to a first data type;
determining a first value interval of the first data type to be mapped to a second value interval of a second data type, wherein the first data type includes a floating-point data type and the second data type includes a fixed-point data type;
mapping at least one value of the input data and the description of the ANN into the second value interval to obtain at least one value of the second data type within the second interval;
replacing the at least one value in the input data and the description of the ANN with the at least one value of the second data type to obtain modified input data and a modified description of the ANN;
performing, based on the modified input data and the modified description of the ANN, the computations of outputs of one or more neurons of the ANN;
determining, based on the outputs of one or more neurons of the ANN, a measure of a quantity of saturations among the outputs of the one or more neurons of the ANN; and
adjusting, based on the measure of the quantity of saturations, at least one of the first value interval or the second value interval.

\* \* \* \* \*